(12) United States Patent
Tobie et al.

(10) Patent No.: US 12,032,273 B2
(45) Date of Patent: Jul. 9, 2024

(54) ADJUSTABLE BACKUP CAMERA FOR VEHICLE TAILGATE

(71) Applicants: Rollin Anthony Tobie, Port Orange, FL (US); Lacey Jean Tobie, Port Orange, FL (US)

(72) Inventors: Rollin Anthony Tobie, Port Orange, FL (US); Lacey Jean Tobie, Port Orange, FL (US)

( * ) Notice: Subject to any disclaimer, the term of this patent is extended or adjusted under 35 U.S.C. 154(b) by 38 days.

(21) Appl. No.: 17/880,938

(22) Filed: Aug. 4, 2022

(65) Prior Publication Data

US 2023/0097232 A1 Mar. 30, 2023

Related U.S. Application Data

(60) Provisional application No. 63/261,684, filed on Sep. 27, 2021.

(51) Int. Cl.
*G03B 17/56* (2021.01)
*B62D 33/03* (2006.01)
*H04N 23/51* (2023.01)
*H04N 23/55* (2023.01)
*H04N 23/661* (2023.01)
*H04N 23/695* (2023.01)

(52) U.S. Cl.
CPC ........... *G03B 17/561* (2013.01); *B62D 33/03* (2013.01); *H04N 23/51* (2023.01); *H04N 23/55* (2023.01); *H04N 23/661* (2023.01); *H04N 23/695* (2023.01)

(58) Field of Classification Search
USPC .......................................... 348/148
See application file for complete search history.

(56) References Cited

U.S. PATENT DOCUMENTS

| | | | |
|---|---|---|---|
| 11,034,288 B2* | 6/2021 | Herrmann | B60Q 1/2696 |
| 11,454,510 B1* | 9/2022 | Gray | B60W 40/06 |
| 2001/0056544 A1* | 12/2001 | Walker | B60R 25/102 |
| | | | 180/170 |
| 2003/0094541 A1* | 5/2003 | Zeineh | B64D 45/0015 |
| | | | 244/118.5 |
| 2015/0005982 A1* | 1/2015 | Muthukumar | B60T 8/1725 |
| | | | 701/1 |
| 2015/0183380 A1* | 7/2015 | Da Deppo | B60R 11/04 |
| | | | 348/148 |
| 2019/0118729 A1* | 4/2019 | Hartland | B60R 11/04 |
| 2022/0141423 A1* | 5/2022 | Schondorf | H04N 7/181 |
| | | | 701/300 |
| 2022/0251893 A1* | 8/2022 | Komaromi | B62D 33/0273 |
| 2022/0258670 A1* | 8/2022 | Hanchett | B60R 1/28 |

(Continued)

*Primary Examiner* — Nigar Chowdhury
(74) *Attorney, Agent, or Firm* — Ballard Spahr LLP

(57) ABSTRACT

A backup camera for mounting on a vehicle tailgate. The backup camera includes a mounting base and an optical support housing rotatably engaged to the mounting base, the optical support housing rotatable between a first housing position and a second housing position; A lens element, generating a field of view, is mounted on the optical support housing and a digital imaging sensor is in communication with the lens element. The field of view is at least partially perpendicular to the tailgate plane when the optical support housing is in the first housing position. The field of view is at least partially parallel to the tailgate plane when the optical support is in the second housing position.

21 Claims, 6 Drawing Sheets

(56) References Cited

U.S. PATENT DOCUMENTS

2023/0017327 A1\* 1/2023 Weston .................. B60R 11/04
2023/0081435 A1\* 3/2023 Briggance ................ B60R 1/00
348/148

\* cited by examiner

ADJUSTABLE BACKUP CAMERA FOR VEHICLE TAILGATE

CROSS REFERENCE TO RELATED APPLICATIONS

This application is based upon and claims benefit of priority to U.S. Provisional Application No. 63/261,684, filed Sep. 27, 2021, which application is hereby incorporated by reference herein.

FIELD OF THE INVENTION

The present invention relates to vehicle video systems including rear mounted video cameras and, more particularly, an adjustable (manual or automatic) platform that allows the camera angle/field of view to change, and thereby remain relatively consistent regardless of tailgate/trunk position.

BACKGROUND

Tailgate or rear hatch backup cameras are commonly fixed in both location and viewing angle, rendering them useless if cargo demands the tailgate or hatch remain in the open position (ex. carrying a dirt bike in a short bed truck or a refrigerator on a pickup truck or SUV) or whenever a bulky item extends past the tailgate/hatch so that the tailgate/hatch needs to remain open. This renders the backup camera ineffective as it is stationary, even if a consumer has upgraded trailering camera systems, including backup cameras on the tailgate and 3rd brake light because a bulky item may cover the 3rd brake light camera as well.

When a tailgate is in the open position, the static backup camera goes from pointing behind the truck to pointing down at ground or hitch. When a car or SUV trunk is in the open position, the static backup camera goes from pointing behind the vehicle to pointing straight up in the open position.

Present systems only work if the mounting surface remains in the closed position. Anything else changes the camera viewing angles to unusable positions.

Therefore, there is a need for an adjustable (manual or automatic) platform that allows the camera angle to change regardless of tailgate/trunk position. The present disclosure adjusts the camera angle allowing user to continue using the backup camera, even with the tailgate/rear hatch in the open position. The present disclosure allows the camera to be either manually or automatically adjusted to reposition/redirecting the effective camera viewing angle regardless of tailgate/hatch positioning, with the repositioning of the angle, the camera remains in the effective position instead of pointing straight down or straight up.

SUMMARY

The invention concerns a backup camera for mounting on a vehicle tailgate, the vehicle tailgate being rotatable between a closed tailgate position and an open tailgate position, the vehicle tailgate defining a tailgate plane. In one example embodiment the backup camera comprises a mounting base configured to be mounted to the vehicle tailgate. The mounting base includes a first base portion and a second base portion. An optical support housing rotatably engages the mounting base. The optical support housing includes a first housing portion and a second housing portion. The optical support housing is rotatable between a first housing position and a second housing position. A lens element is mounted on the optical support housing between the first housing portion and the second housing portion. The lens element generates a field of view. A digital imaging sensor is in communication with the lens element. The field of view is at least partially perpendicular to the tailgate plane when the optical support housing is in the first housing position; and the field of view is at least partially parallel to the tailgate plane when the optical support is in the second housing position.

In an example embodiment the digital imaging sensor rotates with the optical support housing. By way of example the digital imaging sensor is positioned within the mounting base. In a specific example embodiment a camera visor is mounted on the first housing portion. The camera visor covers at least a portion of the lens element.

An example backup camera according to the invention may further comprise a first position limiter stopping rotation of the optical support housing at the first housing position, and a second position limiter stopping rotation of the optical support housing at the second position.

In an example backup camera the first base portion may comprise a first base depth, and the second base portion may comprise a second base depth smaller than the first base depth. By way of example the mounting base includes an angled face surface extending from the first base portion to the second base portion.

In an example embodiment the optical support housing is configured to be manually rotated between the first housing position and the second housing position.

By way of example, the field of view extends from perpendicular to the tailgate plate to 30 degrees downward from perpendicular to the tailgate plane when the optical support housing is in the first housing position.

The invention further encompasses a backup camera for mounting on a vehicle tailgate, the vehicle tailgate rotatable between a closed tailgate position and an open tailgate position, the vehicle tailgate defining a tailgate plane, a tailgate latch and a tailgate striker. In an example embodiment the backup camera comprises a mounting base configured to be mounted to the vehicle tailgate. The mounting base includes a first base portion and a second base portion, an optical support housing rotatably engaged to the mounting base. The optical support housing includes a first housing portion and a second housing portion. The optical support housing is rotatable between a first housing position and a second housing position in this example. A servo is in communication with the optical support housing and configured to move the optical support housing between the first housing position and the second housing position. A processor is in communication with the servo, the processor controlling the servo. A lens element is mounted on the optical support housing between the first housing portion and the second housing portion. The lens element generates a field of view. A digital imaging sensor is in communication with the lens element. The field of view is at least partially perpendicular to the tailgate plane when the optical support housing is in the first housing position and the field of view is at least partially parallel to the tailgate plane when the optical support is in the second housing position.

An example backup camera according to the invention may further comprise at least one sensor in communication with the processor. The sensor indicates the closed tailgate position and the open tailgate position. The processor controls the servo to move into the first housing position when the at least one sensor indicates the closed tailgate position and the processor controls the servo to move into the second housing position when the at least one sensor indicates the open tailgate position.

In an example embodiment the at least one sensor comprises a gyroscopic sensor.

In another example embodiment the at least one sensor comprises a tailgate latch sensor. The tailgate latch sensor indicates the closed tailgate position when the tailgate striker is positioned within the tailgate latch and the tailgate latch sensor indicates the open tailgate position when the tailgate striker is positioned outside the tailgate latch.

In an example embodiment the backup camera may further comprise an in-vehicle control in communication with the processor, the in-vehicle control providing control of the servo.

By way of example, the digital imaging sensor may rotate with the optical support housing. In a further example embodiment the digital imaging sensor may be positioned within the mounting base in a stationary position. A camera visor may be mounted on the first housing portion, the camera visor covering at least a portion of the lens element by way of example.

In an example embodiment the first base portion may comprise a first base depth, and second base portion may comprise a second base depth smaller than the first base depth. The mounting base may further include an angled face surface extending from the first base portion to the second base portion.

Further by way of example, the field of view may extend from perpendicular to the tailgate plate to 30 degrees downward from perpendicular to the tailgate plane when the optical support housing is in the first housing position.

The invention further encompasses a method of installing a backup camera on a vehicle tailgate, the vehicle tailgate rotatable between a closed tailgate position and an open tailgate position, the vehicle tailgate defining a tailgate plane, a tailgate latch and a tailgate striker. An example embodiment of the method comprises the steps of:
mounting a mounting base on the vehicle tailgate;
rotatably mounting an optical support housing to the mounting base, the optical support housing including a first housing portion and a second housing portion, the optical support housing rotatable between a first housing position and a second housing position;
moving the optical support housing between the first housing position and the second housing position using a servo in communication with the optical support housing;
controlling the servo using a processor in communication with the servo;
mounting a lens element on the optical support housing between the first housing portion and the second housing portion, the lens element generating a field of view; and
placing a digital imaging sensor in communication with the lens element;
wherein the field of view is at least partially perpendicular to the tailgate plane when the optical support housing is in the first housing position; and
wherein the field of view is at least partially parallel to the tailgate plane when the optical support is in the second housing position.

An example method according to the invention may further comprise:
placing at least one sensor in communication with the processor, the sensor indicating the closed tailgate position and the open tailgate position;
using the processor to control the servo to move into the first housing position when the at least one sensor indicates the closed tailgate position; and
using the processor to control the servo to move into the second housing position when the at least one sensor indicates the open tailgate position.

Additionally, an example method may further comprise:
mounting at least one sensor on the tailgate latch;
wherein the at least one sensor indicates the closed tailgate position when the tailgate striker is positioned within the tailgate latch; and
wherein the at least one sensor indicates the open tailgate position when the tailgate striker is positioned outside the tailgate latch.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Figure 1:
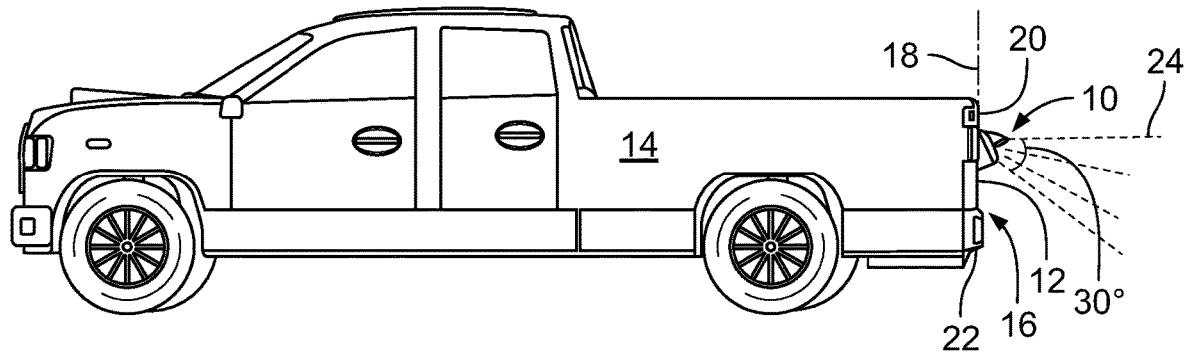
FIG. 1 is a side view of a backup camera in accordance with one aspect of the present disclosure, the backup camera installed on a vehicle tailgate, the tailgate in the closed position.
Figure 2:
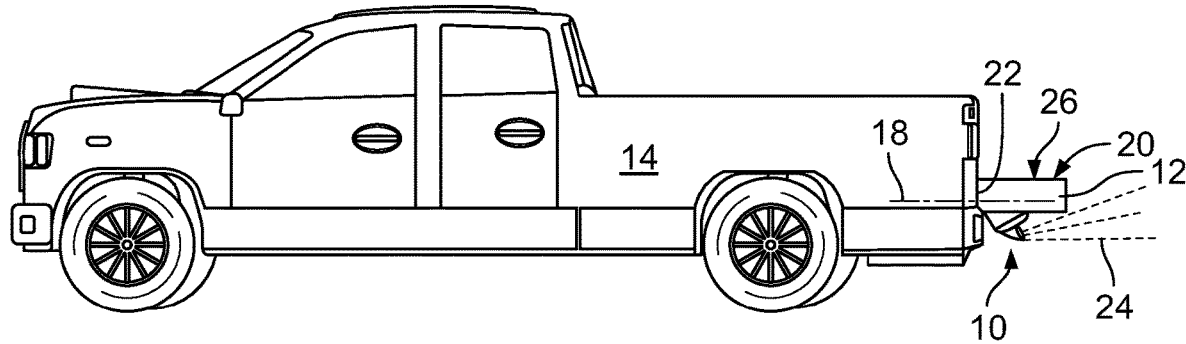
FIG. 2 a side view of a backup camera shown in FIG. 1, the backup camera installed on a vehicle tailgate, the tailgate in the open position.

FIGS. 1-2 show a backup camera 10 in accordance with one aspect of the present disclosure. The backup camera 10 is shown mounted on a vehicle tailgate 12 of a pickup truck 14. In FIG. 1, the vehicle tailgate 12 is in the closed tailgate position 16. The vehicle tailgate 12 defines a tailgate plane 18 which is orientated vertically when the vehicle tailgate 12 is in the closed tailgate position 16. For the purposes of this disclosure, the term upwards will be along the tailgate plane 18 towards the tailgate top 20 and downwards will be along the tailgate plane 18 towards the tailgate bottom 22. It should be under stood that the backup camera is not to scale and is drawn larger for illustrative purposes. The backup camera 10, in one aspect, generates a field of view 24 that (while the vehicle tailgate 12 is in the closed tailgate position 16) ranges from approximately perpendicular to the tailgate plane 18 to approximately 30 degrees downward from the tailgate plane 18. In other aspects, different ranges are contemplated depending on the particular application.

In FIG. 2, the backup camera 10 is shown on the vehicle tailgate 12 of the pickup truck 14 while the vehicle tailgate 12 is in the open tailgate position 26. The backup camera 10, in one aspect, generates the field of view 24 that (while the vehicle tailgate 12 is the open tailgate position 26) that is at least partially parallel to the tailgate plane 18. In another aspect, the field of view 24 when in the open tailgate position 26 rages from approximately parallel to the tailgate plane 18 to approximately 30 degrees upward from the tailgate plane 18.

Figure 3:
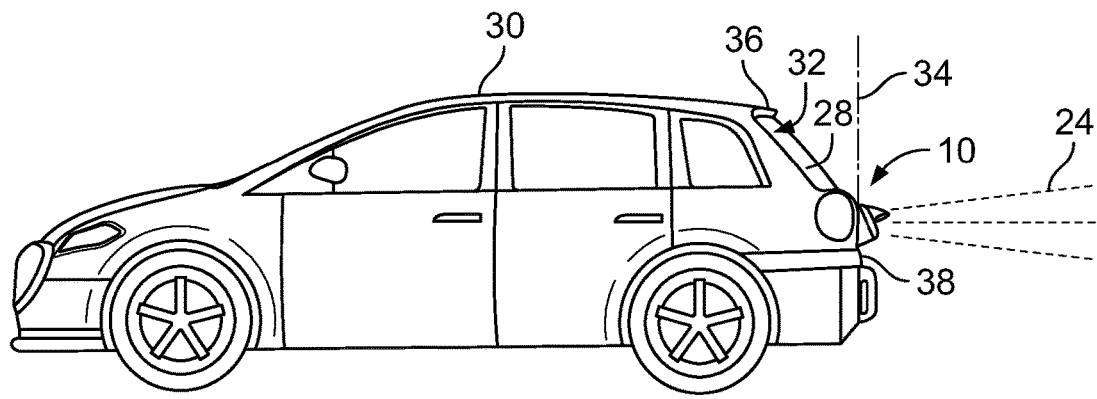
FIG. 3 is a side view of a backup camera in accordance with one aspect of the present disclosure, the backup camera installed on a vehicle liftgate, the liftgate in the closed position.
Figure 4:
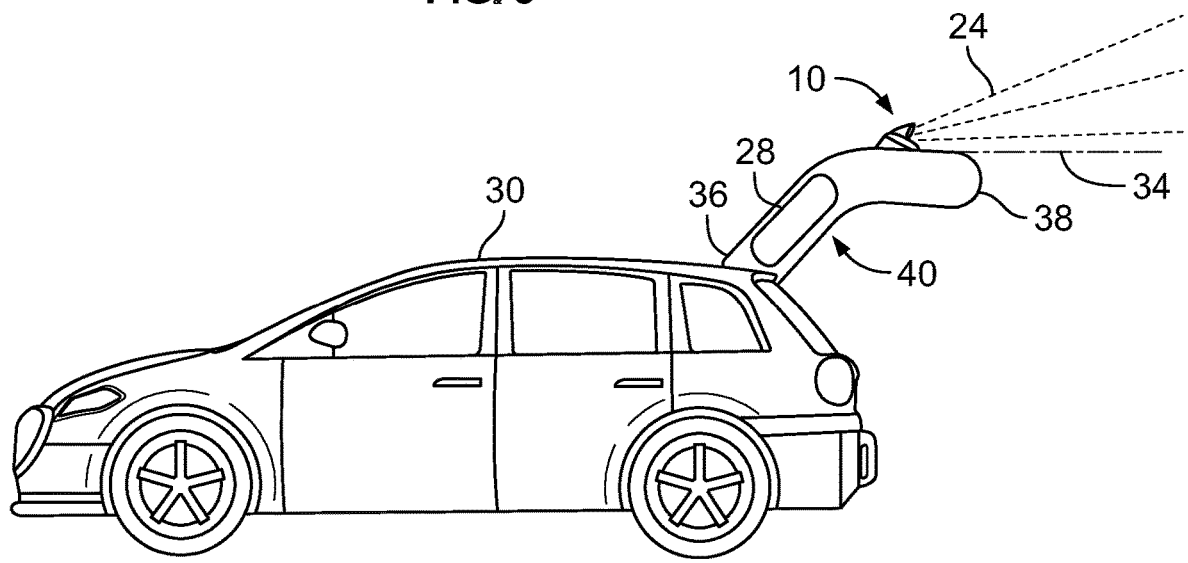
FIG. 4 is a side view of a backup camera shown in FIG. 1, the backup camera installed on a vehicle tailgate, the tailgate in the open position.
Figure 5:
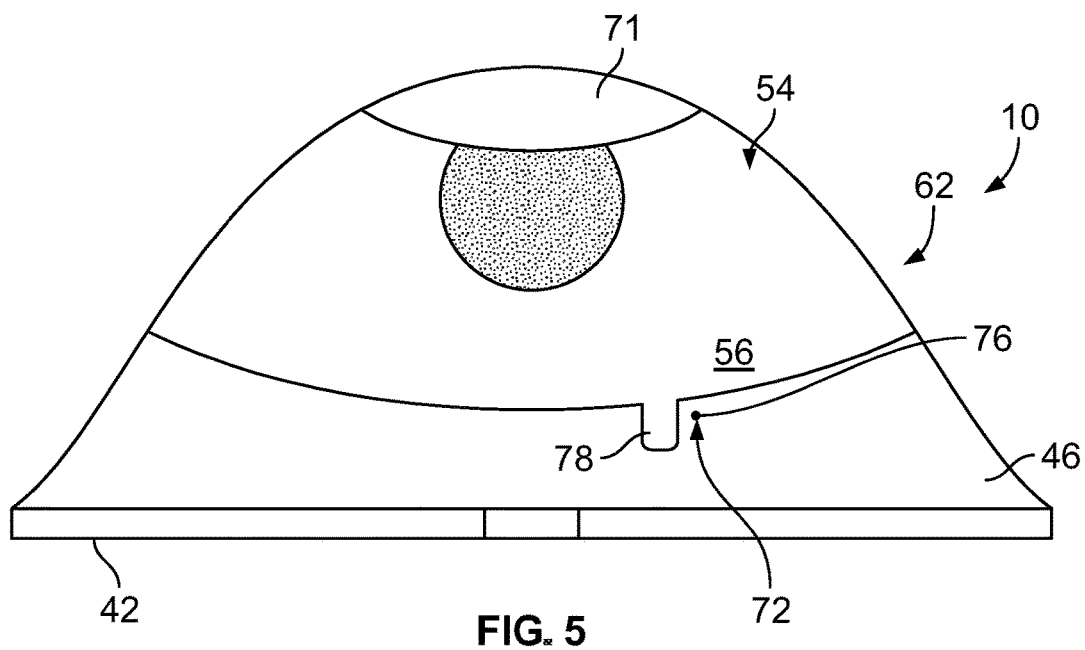
FIG. 5 is a front view of the backup camera shown in FIGS. 1-4.
Figure 6:
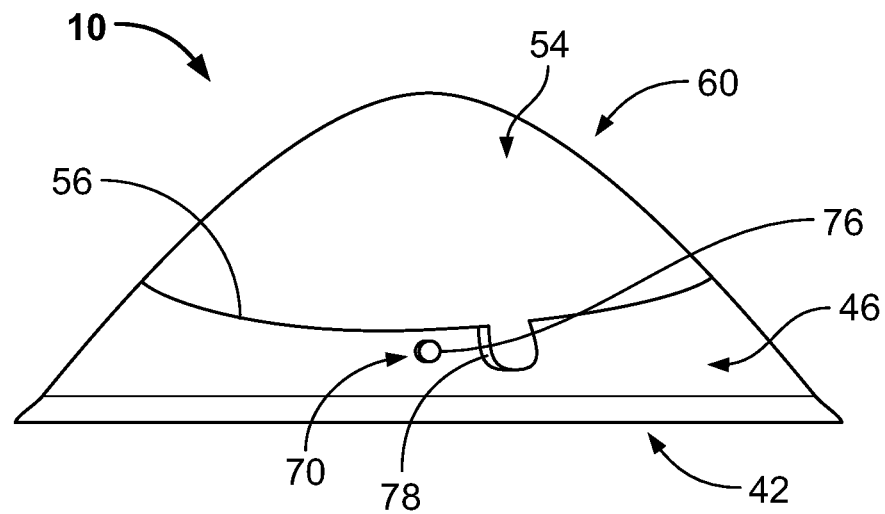
FIG. 6 is a rear view of the backup camera shown in FIG. 5.
Figure 7:
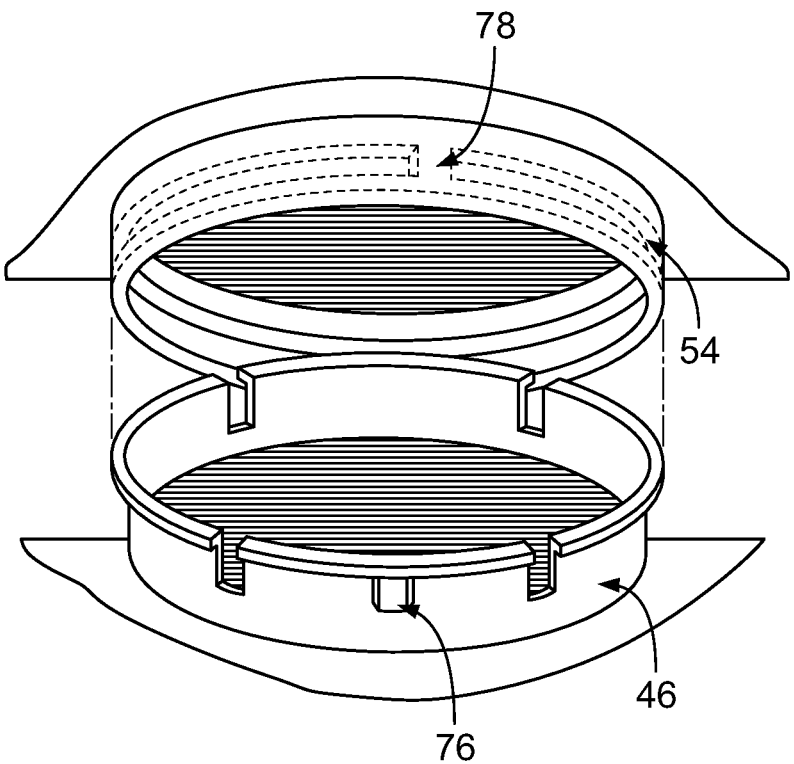
FIG. 7 is an alternate aspect of the backup camera shown in FIGS. 1-5, the aspect illustrating in internal stop.
Figure 8:
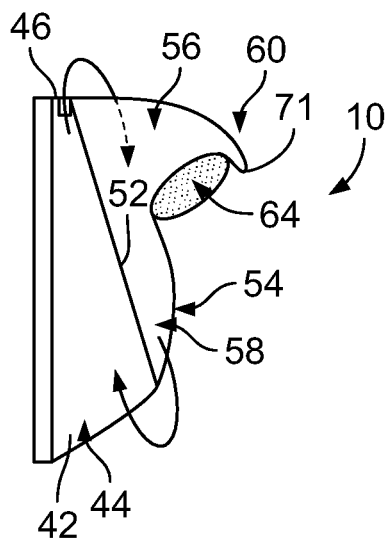
FIG. 8 is a side view of the backup camera shown in FIG. 5, the backup camera shown in the first housing position.

FIGS. 3-4 show the backup camera 10 in an alternate arrangement mounted on a vehicle liftgate 28 of a Sports Utility Vehicle 30. In FIG. 3, the liftgate 28 is shown in the closed liftgate position 32. The vehicle liftgate 28 defines a liftgate plane 34 which is orientated vertically when the vehicle liftgate 28 is in the closed liftgate position 32. For the purposes of this disclosure, the term upwards will be along the liftgate plane 34 towards the liftgate top 36 and downwards will be along the liftgate plane 34 towards the liftgate bottom 38. It should be under stood that the backup camera is not to scale and is drawn larger for illustrative purposes. Additionally, for the purposes of this disclosure the terms vehicle tailgate 12 and vehicle liftgate 28 may be used interchangeably. The backup camera 10, in one aspect, generates the field of view 24 that (while the vehicle liftgate 28 is in the closed liftgate position 32) ranges from approximately perpendicular to the liftgate plane 34 to approximately 30 degrees downward from the liftgate plane 34. In other aspects, different ranges are contemplated depending on the particular application.

In FIG. 4, the backup camera 10 is shown on the vehicle liftgate 28 of the Sports Utility Vehicle 30 while the vehicle liftgate 28 is in the open liftgate position 40. The backup camera 10, in one aspect, generates the field of view 24 that (while the vehicle liftgate 28 is the open liftgate position 40) that is at least partially parallel to the liftgate plane 34.

Referring now to FIGS. 5-9 which show a backup camera 10 in one aspect of the present disclosure. The backup camera 10 includes a mounting base 42 configured to me mounted to the surface of vehicle tailgate 12 or vehicle liftgate 28. Although a variety of mounting locations are contemplated, in at least one aspect the mounting location is at the handle for the tailgate/liftgate 12, 28. In one aspect of the current disclosure, it is contemplated that the disclosed backup camera 10 could be used to replace the existing cameras installed by the manufacturer. In another aspect, the disclosed backup camera 10 could be original equipment or installed in as a new camera in a dedicated location. The mounting base 42 includes a first base portion 44 and a second base portion 46 (see FIGS. 8 and 9). The first base housing portion 44 defines a first base depth 48. The second base portion 46 defines a second base depth 50. In at least one aspect of the current disclosure, the second base depth 50 is smaller than the first base depth 48 such that the mounting base 42 has an angled face surface 52 extending from the second base portion 46 to the first base portion 44.

Figure 9:
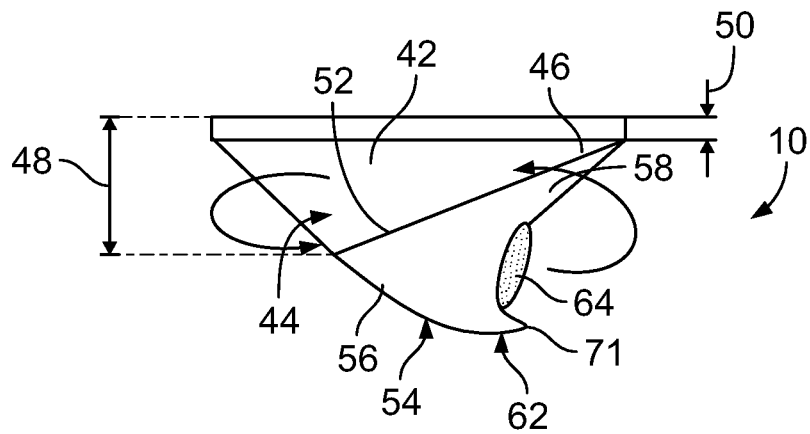
FIG. 9 is a side view of the backup camera shown in FIG. 5, the backup camera shown in the second housing position.
Figure 10:
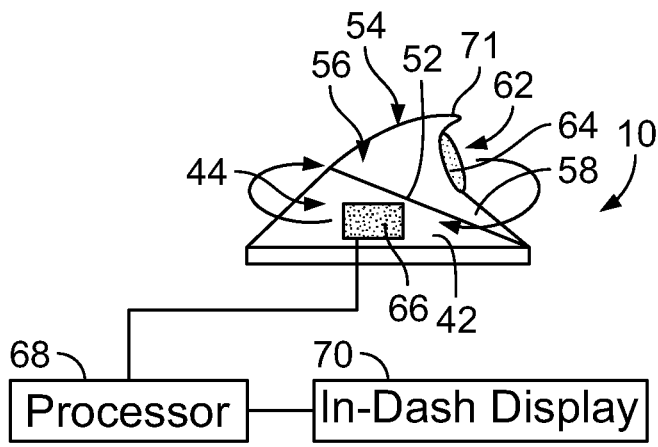
FIG. 10 is a side view of a backup camera in accordance with one aspect of the present disclosure, the backup camera shown with the digital imaging sensor positioned within the mounting base.
Figure 11:
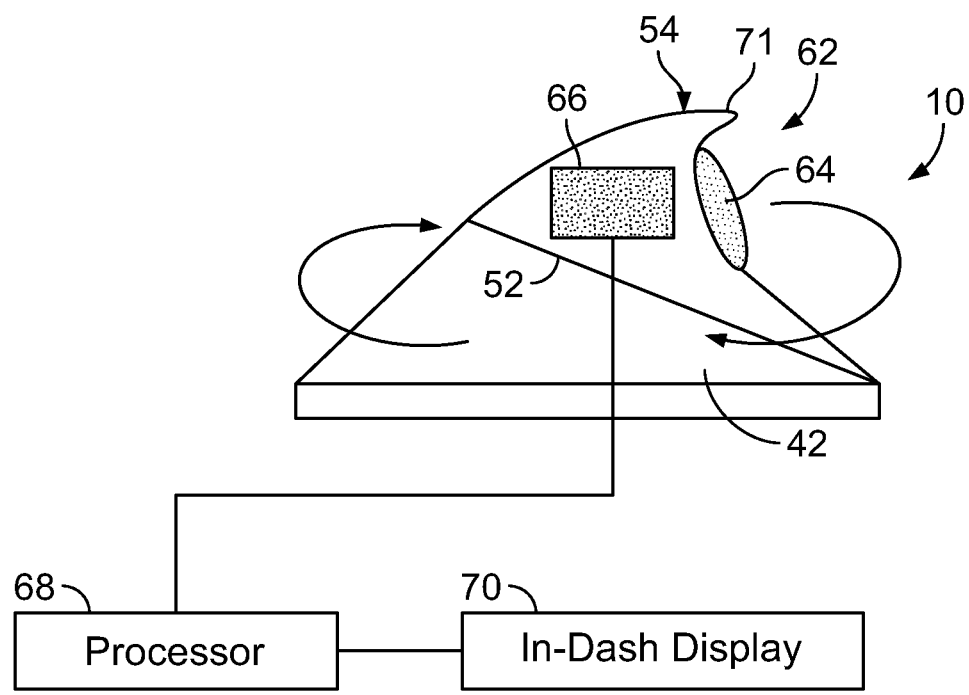
FIG. 11 is a side view of a backup camera in accordance with one aspect of the present disclosure, the backup camera shown with the digital imaging sensor positioned within the optical support housing.

In one aspect of the disclosure, the backup camera 10 may further includes an optical support housing 54 that is rotatably engaged to the mounting base 42 at the angled face surface 52. The optical support housing 54 includes a first housing portion 56 and a second housing portion 58. The optical support housing 54 is rotatable on the angled face surface 52 between a first housing position 60 (FIG. 8) and a second housing position 62 (FIG. 9). A lens element 64 is mounted on the optical support housing 54 and generates the field of view 24 that is controlled by its position and orientation. The lens element 64 is in communication with a digital imaging sensor 66 that captures this field of view 24 and communicates it digitally to a processor 68 (see FIGS. 8 and 9). The processor 68 then communicates the image derived from the field of view 24 to an in-dash display 70. When the optical support housing 62 is in the first housing position 60, the field of view 24 is at least partially perpendicular to the tailgate plane 18/liftgate plane 34 in one aspect. In another aspect, when the optical support housing 62 is in the first housing position 60, the field of view 24 ranges from approximately perpendicular to the tailgate plane 18/liftgate plane 34 liftgate plane 34 to approximately 30 degrees downward from the tailgate plane 18/liftgate plane. When the vehicle tailgate 12/vehicle liftgate 28 are in the closed tailgate position 16/closed liftgate position 32, this means that the field of view 24 will point directly behind the vehicle 14, 30 and towards the ground (see FIGS. 1 and 3).

In one aspect of the disclosure, when the optical support housing 54 is in the second housing position 62, the field of view is at least partially parallel to the tailgate plane 18/liftgate plane 34 (see FIGS. 2 and 3). When the vehicle tailgate 12/vehicle liftgate 28 is in the open tailgate position 26/open liftgate position 40, this means that the field of view 24 will still encompass a view directly behind the vehicle 14, 30. This allows the operator of the vehicle 14, 30 to be able to back up with a view directly behind the vehicle 14, 30 independent of whether the vehicle tailgate 12/vehicle liftgate 28 are open or closed. The optical support housing 54 may further comprise a camera visor 71 formed on the first housing portion 56 and covering at least a portion of the lens element 64. This can prevent glare interference as well as keep rain off of the lens element 64. In one aspect of the disclosure, the camera visor 71 is formed as a unitary module with the first housing portion 56.

In one aspect of the disclosure, it is contemplated that the optical support housing 54 may be manually moved between the first housing position 60 and the second housing position 62 when the operator opens or shuts the tailgate 12/liftgate 28. In one aspect, the backup camera 10 may include a first position limiter 72 that stops rotation of the optical support housing 54 in the first housing position 60 (see FIG. 5). The backup camera 10 may further include a second position limiter 74 that stops rotation of the optical support housing 54 in the second housing position 62 (see FIG. 6). In one aspect, the first position limiter 72 and the second position limiter 74 are contemplated to comprise protrusions 76 on the mounting base 42 or optical support housing 54 that interfere with a projection 78 formed on the other of the mounting base 42 or optical support housing 54. In another aspect, it is contemplated that the first position limited 72 and the second position limiter 74 may be placed internally (see FIG. 7). Other position limiters, however, are contemplated in light of this disclosure.

Figure 12:
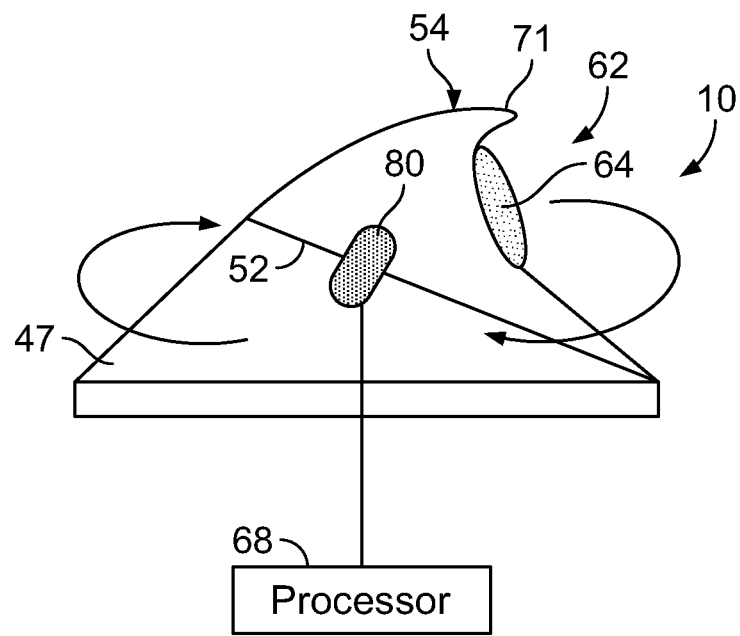
FIG. 12 is a side view of a backup camera in accordance with one aspect of the present disclosure, the backup camera shown including a solenoid and processor to automatically change the backup camera position.

In another aspect of the disclosure, it is contemplated that the position of the optical support housing 54 may be automated in response to the positioning of the vehicle tailgate 12/vehicle liftgate 28. In this aspect, the backup camera 10 may further include a servo 80 mounted within the backup camera 10 and in communication with the optical support housing 54 (see FIG. 12). The servo 80 is configured to move the optical support housing 54 between the first housing position 60 and the second housing position 62. The servo 80 is in communication with the processor 68 to move the optical support housing 54 into the first housing position 60 when the tailgate 12/liftgate 30 are in the closed position 16, 32. The processor 68 controls the servo 80 to move the optical support housing 54 into the second housing position 62 when the tailgate 12/liftgate 30 are in the open position 26, 40.

Figure 13:
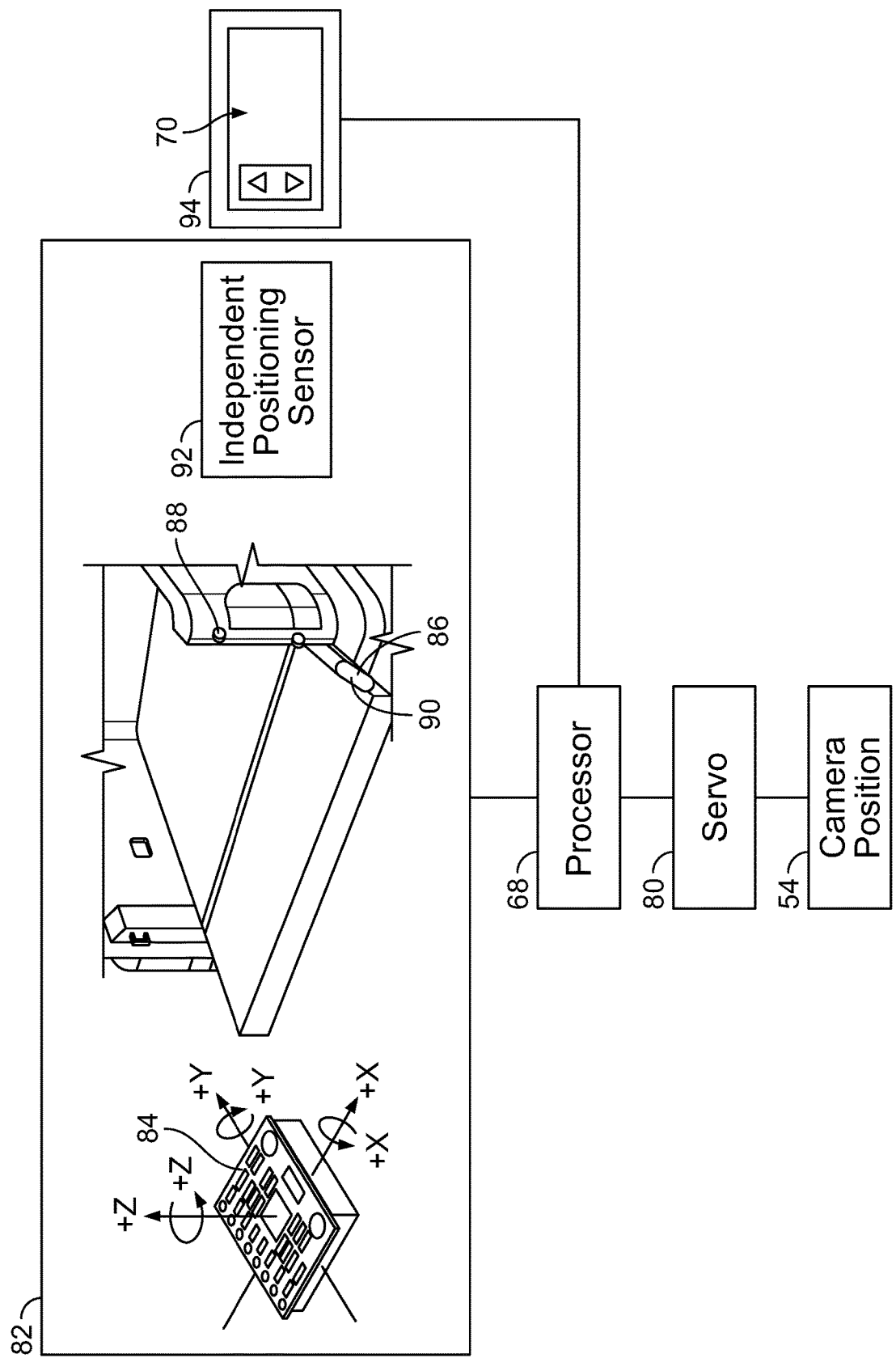
FIG. 13 is a flow chart of the backup camera system in accordance with one aspect of the present disclosure.

In one aspect of the disclosure, the processor 68 determines the position of the tailgate 12/liftgate 30 by being in communication with at least one sensor 82 (see FIG. 13). In one aspect, the sensor 82 may comprise a gyroscopic sensor 84 to determine the position of the tailgate 12/liftgate 30. In another aspect, the sensor 82 may comprise a latch sensor 86 that senses whether the striker 88 of the vehicle is positioned within the latch 90. This aspect provides a simple and reliable indication of the open or shut closed status. In another aspect, the sensor 82 may comprise and independent positioning sensor 92. The term independent positioning sensor 92 is intended to encompass any existing sensor installed in the vehicle to monitor position of the tailgate 12/liftgate 30. In still another aspect of the current disclosure, the processor 68 may be in communication with an in-vehicle control 92, such as the touchscreen of the in-dash display 70 to allow the operator to adjust the position of the optical support housing 54 from inside the vehicle. This aspect may be used alone or in combination with the sensors 82 to allow an override of sensor indications for particular applications such as partially open/partially closed scenarios. In at least one aspect of the disclosure, the in-vehicle control 94 is contemplated to allow movement of the optical support housing to positions in-between the first housing position 60 and the second housing position 62 to allow the operator to manually adjust the view to particular operating conditions.

What is claimed is:

1. A backup camera for mounting on a vehicle tailgate, the vehicle tailgate rotatable between a closed tailgate position and an open tailgate position, the vehicle tailgate defining a tailgate plane, the backup camera comprising:
   a mounting base configured to be mounted to the vehicle tailgate, the mounting base including a first base portion and a second base portion;
   an optical support housing rotatably engaged to the mounting base, the optical support housing rotatable about an axis of rotation, the axis of rotation configured to extend through the tailgate plane, the optical support housing including a first housing portion and a second housing portion, the optical support housing rotatable between a first housing position and a second housing position;
   a lens element mounted on the optical support housing between the first housing portion and the second housing portion, the lens element generating a field of view; and
   a digital imaging sensor in communication with the lens element;
   wherein the field of view is at least partially perpendicular to the tailgate plane when the optical support housing is in the first housing position; and
   wherein the field of view is at least partially parallel to the tailgate plane when the optical support is in the second housing position.

2. The backup camera of claim 1, wherein the digital imaging sensor rotates with the optical support housing.

3. The backup camera of claim 1, wherein the digital imaging sensor is positioned within the mounting base.

4. The backup camera of claim 1, further comprising:
   a camera visor mounted on the first housing portion, the camera visor covering at least a portion of the lens element.

5. The backup camera of claim 1, further comprising:
   a first position limiter stopping rotation of the optical support housing at the first housing position; and
   a second position limiter stopping rotation of the optical support housing at the second position.

6. The backup camera of claim 1, wherein the first base portion comprises a first base depth,
   wherein the second base portion comprises a second base depth smaller than the first base depth, and
   wherein the mounting base includes an angled face surface extending from the first base portion to the second base portion.

7. The backup camera of claim 1, wherein in the optical support housing is configured to be manually rotated between the first housing position and the second housing position.

8. The backup camera of claim 1, wherein the field of view extends from perpendicular to the tailgate plate to 30 degrees downward from perpendicular to the tailgate plane when the optical support housing is in the first housing position.

9. A backup camera for mounting on a vehicle tailgate, the vehicle tailgate rotatable between a closed tailgate position and an open tailgate position, the vehicle tailgate defining a tailgate plane, a tailgate latch and a tailgate striker, the backup camera comprising:
   a mounting base configured to be mounted to the vehicle tailgate, the mounting base including a first base portion and a second base portion;
   an optical support housing rotatably engaged to the mounting base, the optical support housing rotatable about an axis of rotation, the axis of rotation configured to extend through the tailgate plane, the optical support housing including a first housing portion and a second housing portion, the optical support housing rotatable between a first housing position and a second housing position;

a servo in communication with the optical support housing and configured to move the optical support housing between the first housing position and the second housing position;

a processor in communication with the servo, the processor controlling the servo;

a lens element mounted on the optical support housing between the first housing portion and the second housing portion, the lens element generating a field of view; and a digital imaging sensor in communication with the lens element;

wherein the field of view is at least partially perpendicular to the tailgate plane when the optical support housing is in the first housing position; and wherein the field of view is at least partially parallel to the tailgate plane when the optical support is in the second housing position.

10. The backup camera of claim 9, further comprising:
at least one sensor in communication with the processor, the sensor indicating the closed tailgate position and the open tailgate position;
wherein the processor controls the servo to move into the first housing position when the at least one sensor indicates the closed tailgate position; and
wherein the processor controls the servo to move into the second housing position when the at least one sensor indicates the open tailgate position.

11. The backup camera of claim 10, wherein the at least one sensor comprises a gyroscopic sensor.

12. The backup camera of claim 10, wherein the at least one sensor comprises a tailgate latch sensor;
wherein the tailgate latch sensor indicates the closed tailgate position when the tailgate striker is positioned within the tailgate latch; and
wherein the tailgate latch sensor indicates the open tailgate position when the tailgate striker is positioned outside the tailgate latch.

13. The backup camera of claim 10, further comprising:
an in-vehicle control in communication with the processor, the in-vehicle control providing control of the servo.

14. The backup camera of claim 9, wherein the digital imaging sensor rotates with the optical support housing.

15. The backup camera of claim 9, wherein the digital imaging sensor is positioned within the mounting base in a stationary position.

16. The backup camera of claim 9, further comprising:
a camera visor mounted on the first housing portion, the camera visor covering at least a portion of the lens element.

17. The backup camera of claim 9, wherein the first base portion comprises a first base depth,
wherein the second base portion comprises a second base depth smaller than the first base depth, and
wherein the mounting base includes an angled face surface extending from the first base portion to the second base portion.

18. The backup camera of claim 9, wherein the field of view extends from perpendicular to the tailgate plate to 30 degrees downward from perpendicular to the tailgate plane when the optical support housing is in the first housing position.

19. A method of installing a backup camera on a vehicle tailgate, the vehicle tailgate rotatable between a closed tailgate position and an open tailgate position, the vehicle tailgate defining a tailgate plane, a tailgate latch and a tailgate striker, the method comprising:
mounting a mounting base on the vehicle tailgate;
rotatably mounting an optical support housing to the mounting base, the optical support housing rotatable about an axis of rotation, the axis of rotation extending through the tailgate plane, the optical support housing including a first housing portion and a second housing portion, the optical support housing rotatable between a first housing position and a second housing position;
moving the optical support housing between the first housing position and the second housing position using a servo in communication with the optical support housing;
controlling the servo using a processor in communication with the servo;
mounting a lens element on the optical support housing between the first housing portion and the second housing portion, the lens element generating a field of view; and
placing a digital imaging sensor in communication with the lens element;
wherein the field of view is at least partially perpendicular to the tailgate plane when the optical support housing is in the first housing position; and
wherein the field of view is at least partially parallel to the tailgate plane when the optical support is in the second housing position.

20. The method of claim 19, further comprising:
placing at least one sensor in communication with the processor, the sensor indicating the closed tailgate position and the open tailgate position;
using the processor to control the servo to move into the first housing position when the at least one sensor indicates the closed tailgate position; and
using the processor to control the servo to move into the second housing position when the at least one sensor indicates the open tailgate position.

21. The method of claim 20, further comprising:
mounting at least one sensor on the tailgate latch;
wherein the at least one sensor indicates the closed tailgate position when the tailgate striker is positioned within the tailgate latch; and
wherein the at least one sensor indicates the open tailgate position when the tailgate striker is positioned outside the tailgate latch.

* * * * *